United States Patent
Chittick

[11] 3,755,919
[45] Sept. 4, 1973

[54] SLIDE PROJECTOR SPECIALLY ADAPTED FOR SELF-TEACHING

[75] Inventor: Donald E. Chittick, Newberg, Oreg.

[73] Assignee: William E. Bales, Newberg, Oreg.; a part interest

[22] Filed: Apr. 29, 1971

[21] Appl. No.: 138,578

[52] U.S. Cl. .............................................. 35/9 A
[51] Int. Cl. ............................................. G09b 7/02
[58] Field of Search ..................... 35/9 R, 9 A, 8 A, 35/8 R

[56] References Cited
UNITED STATES PATENTS

| | | | |
|---|---|---|---|
| 3,648,388 | 3/1972 | Lowell et al. | 35/9 A |
| 3,187,442 | 6/1965 | Hertsche | 35/9 A |
| 3,466,758 | 9/1969 | Miller | 35/8 R |
| 3,570,146 | 3/1971 | Golden | 35/9 R |
| 3,483,633 | 12/1969 | Geils et al. | 35/9 A |
| 3,611,587 | 10/1971 | Roberts | 35/8 A |
| 3,353,280 | 11/1967 | Emde | 35/9 A |

Primary Examiner—Wm. H. Grieb
Attorney—Daniel P. Chernoff and Jacob F. Vilhauer, Jr.

[57] ABSTRACT

A remote controlled automatically cycling slide projector for successively displaying photographic slides, each containing a visual question or problem and multiple choice answers thereto. The frame of each slide is provided with a notch on the top edge thereof specially positioned to correspond to the correct answer choice to the problem posed by the slide. Each slide is displayed in a specially adapted slide holder equipped with a series of tumbler actuated electrical switches respectively aligned with and adjacent to notch positions on the edge of the frame corresponding to answer choices to the problem. Each of the tumbler switches is spring biased to its closed position, but the insertion of a slide in the slide holder opens all of the switches except the one whose tumbler is in alignment with the notch corresponding with the correct answer. The closed tumbler switch partially completes a circuit which, when fully completed, actuates the automatic slide advance mechanism of the projector. The student operating the projector is provided with a remote control panel having a series of response push buttons corresponding to the multiple choice answers presented on the displayed slide. Each push button closes a normally open electrical switch connected in series with a respective one of the tumbler actuated switches. When any related pair of tumbler and push button switches are closed by the student's depression of the button corresponding to the correct answer, the slide advancing circuit is fully completed and the projector cycles to the next slide, in the process informing the student that he has selected the correct answer. If the student selects the wrong answer no slide advancing circuit is completed and the failure of the projector to advance informs the student of his error. In such case the student makes other selections until the correct response button is pressed and the slide advances. The student's remote control panel is also provided with a switch for reversing the succession of the cycled slides in case the student wishes to review previous slides. In reverse mode the cycling circuit bypasses the tumbler switches and the student need only press one designated response button for successive reverse cycling of the slides rather than the correct answer button for each slide. The remote control panel has lights indicating whether the projector is in forward or reverse cycling mode, and is further provided with a focusing control. It also has a socket for the projector manufacturer's standard remote control device which, when connected to the socket, completely bypasses all the aforementioned specially adapted teaching circuitry and allows operation of the projector in normal manner with or without notched farme slides. A modified form of the student's remote control panel has additional circuitry for automatically actuating an audio tape player in synchronization with the slide display.

21 Claims, 8 Drawing Figures

Patented Sept. 4, 1973　　　　　　　　　　　　　　　　　　　　　3,755,919

SLIDE PROJECTOR SPECIALLY ADAPTED FOR SELF-TEACHING

BACKGROUND OF THE INVENTION

This invention relates to self-teaching apparatus for the presentation of visual and audible problems or questions to a student. More particularly the teaching device comprises a simple adaptation of a standard automatic remote controlled slide projector which has means for registering the student's answers and indicating to him whether or not the answer selected is correct.

In teaching devices of the type known to the art and shown for example in Emde U.S. Pat. No. 3,353,280, specially designed information slides, storage centers, separators, conveyors, scanners, sound tracks and displaying means are all necessary to the composition of the complete teaching system. Unfortunately a teaching system utilizing so many specially designed components is complex, expensive and not particularly suited for any purpose other than that for which it is specifically designed. Therefore such systems are beyond the economic resources of many schools and other instructional institutions who might otherwise use them.

Such prior art systems typically utilize complex programming wherein a proper teaching presentation depends on the maintenance of proper order and interdependency among the various information units which make up the program. Little latitude is provided for modification with respect to the components or the sequencing of any particular program. Moreover the flexibility enabling the student operator to selectively review previously covered information is limited.

Accordingly there is a great need in the field of teaching devices to provide an inexpensive an simple means of modifying multiple-purpose visual and audible devices such as standard slide projectors and tape recorders to perform the specialized self-teaching functions described above. Moreover it is desirable that such teaching devices be capable of simple and flexible programming without complicated interdependencies among various information units and without need for precise sequencing of information. In addition the student should be provided with as much flexibility as possible in operation of the machine, particularly with regard to reviewing material previously covered.

SUMMARY OF THE PRESENT INVENTION

The present invention is directed to a visual self-teaching adaptation of a standard remote controlled automatic cycling slide projector in which each slide, containing a question or problem and multiple-choice answers thereto, is provided with a frame specially notched in a position corresponding to the correct answer for that slide.

As each slide is displayed a series of electrical tumbler switches senses the correct answer from the notched frame and partially completes one of several possible circuits for actuating the automatic slide advance mechanism of the projector. The student is provided with a remote control panel having multiple response button switches, each corresponding with one of the multiple choice answers. If the student presses the button corresponding to the correct answer for a particular slide, he fully completes the slide advance circuit already partially completed by the tumbler switch, and the projector automatically cycles to the next slide. If the student presses the wrong button, he does not thereby complete a circuit and the projector does not advance until the correct button is pressed.

Each slide has its own individual coded notch indicia, and there is no interdependency or relation between the indicia of any two slides. Therefore slides may be removed or added, or their sequence changed, without adversely affecting the correct operation of the teaching device.

The student's remote control panel is provided with a switch for reversing the slide advance mechanism of the projector causing it to display slides in reverse succession. The actuation of the slide advance mechanism into reverse mode partially completes a slide advance circuit connected to one of the student's response buttons. The circuit bypasses all of the tumbler switches, thereby allowing the student to display the slides in reverse succession by pressing the same response button for each slide rather than the particular response button corresponding to the correct answer for each slide. Forward and reverse mode indicator lights on the student's control panel identify which mode the apparatus is in. The student's control panel is further provided with means for attaching the projector manufacturer's remote control device to allow operation of the projector in a normal manner with or without notched frame slides.

In one embodiment of the invention the student's remote control panel actuates an audio tape player in synchronization with the slide display. This form of the invention requires that each slide contain coded notch indicia, in addition to that corresponding to the correct answer, to indicate whether or not there is audible information on the tape player corresponding with that slide. As each slide is displayed an electrical tumbler switch senses this information from the notched frame and, if audio information is indicated, completes a circuit for actuating the tape player by remote control. The player is a two channel tape player having the audio information on one channel and a signal on the other channel indicating when each segment of information, corresponding to one slide, is finished. Through amplification, this signal causes interruption of the tape control circuit and thus stops the tape player after each segment of audio information is completed. The tape player is not restarted until the student advances to the next slide, and then only if that slide contains the coded notch indicia indicating that audio information accompanies the slide. The tape control circuitry inhibits the slide projector from advancing to the next slide while the tape player is actuated, thus ensuring proper synchronization of the audio information with the slide presentation.

The features of the invention described above provide a self-teaching device having several important advantages. First, the major portion of the equipment comprising the device is conventional, i.e., a standard slide projector and tape recorder, which is of widespread and relatively inexpensive manufacture and thus the purchase price and availability of such equipment is within the reach of nearly every teaching institution. Only the installation of an inexpensive modified slide holder, switch and socket assemblies and a remote control panel are required to complete the modification of the device into the self-teaching apparatus of the present invention.

Second, program preparation is implemented easily by equipment readily available. All that is needed to program conventional framed slides so that they will function in the device is a notching tool for notching the slide frame edges. This tool may be an ordinary paper ticket punch of proper size, or more conveniently an inexpensive punch made especially for the purpose of notching slides. Moreover, since each slide is programmed independently, maximum flexibility is provided both with regard to the content and sequence of any teaching program presented with the device, and the subsequent modification thereof.

Third, the provision for program reversing means allowing the student to review previously covered material greatly enhances the effectiveness of the device as a reinforcing selfteaching tool.

Fourth, for provision of novel audio control circuitry in conjunction with the notched slides ensures that the audio presentation will remain synchronized with the slide presentation by making the tape control circuit responsive both to notched slide indicia and to audio segment completion signals, and by inhibiting the student's advancement to the next slide until the previous audio segment is completed.

It is therefore a principal objective of the present invention to provide a new, improved and inexpensive audio visual self-teaching, device constructed primarily from inexpensive, readily available, multipurpose components.

It is a further objective of the invention to provide a teaching device utilizing a form of programming both easily implemented and easily modified as to content and sequence.

It is a still further objective of the invention to provide a teaching device which facilitates review of the student of previously covered material if he so wishes.

The foregoing and other objectives, features and advantages of the present invention will be more readily understood upon consideration of the following detailed description of the invention taken in conjunction with the accompanying drawings.

DESCRIPTION OF THE PREFERRED EMBODIMENT

Figure 1:
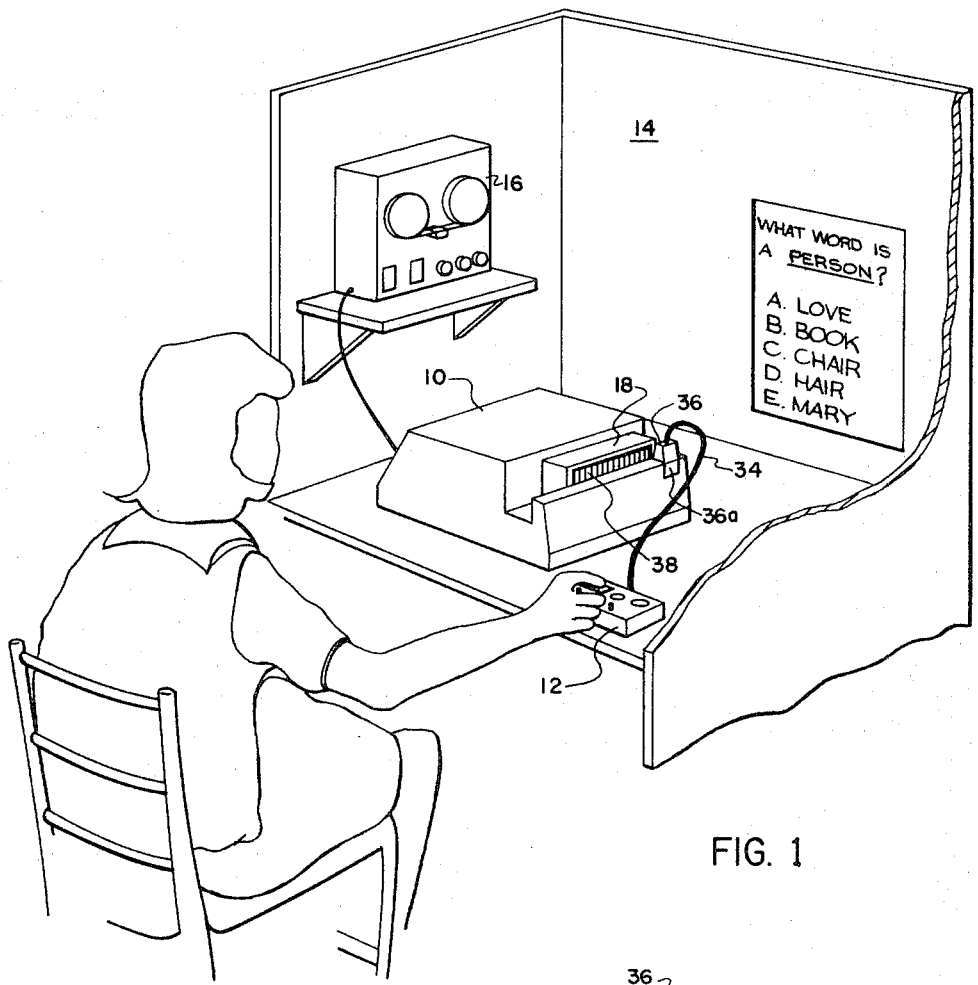
FIG. 1 is a pictorial view showing a typical installation of the invention in a study carrel.

The teaching device, as seen in FIG. 1, comprises a slide projector 10 controlled by a student's remote control and response terminal 12 for projecting slides onto a viewing surface 14. In one embodiment of the invention an aduio tape player 16 is coupled with the system to provide audio-visual teaching. Since the system can be utilized effectively as a purely visual teaching device without the tape recorder, the initial description which follows is directed only to the visual aspects. The coupling of the tape recorder is later described in conjunction with FIG. 8.

The slide projector is a standard, remote controlled, automatically cycling projector, exemplarily the GAF Anscomatic 680 manufactured by GAF Corporation of New York. The projector has a fully automatic slide advancing mechanism which removes slides one at a time from a slide tray 18 and successively displays them.

Figure 2:
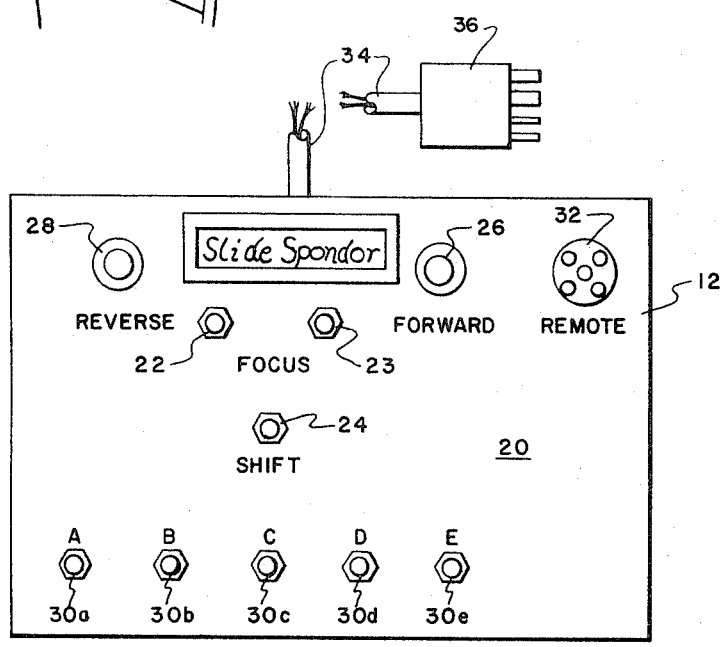
FIG. 2 is a top view of the panel of the student's remote control terminal and connector plug for coupling the panel with a modified slide projector.

The student's control and response terminal 12 has a control panel 20 as shown in FIG. 2. The control panel contains focus control button switches 22 and 23, and shift button switch 24 for switching the cycling mode of the projector's automatic slide advance mechanism between forward and reverse. Indicator light 26 is lit when the slide advance mechanism is in forward mode, and indicator light 28 is lit when it is in reverse mode. Response button switches 30a, b, c, d, and e, respectively are the means by which the student indicates his response to the multiple choice questions presented visually by the slide projector, in a manner to be more fully explained hereafter. Socket 32 is provided on the panel 20 for plugging in the projector manufacturer's standard remote control device in the event normal projector operation is desired instead of the special teaching mode of operation provided through the use of terminal 12. Terminal 12 is connected to slide projector 10 through electrical conduit 34, with plug 36 fitting into socket 36a provided on the projector.

Figure 7:
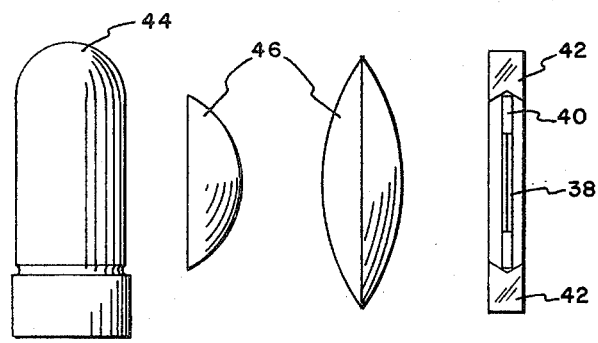
FIG. 7 is a partially schematic edge view of a slide being held for display in the projector, with the projector lamp and related lenses shown schematically.

Turning now to the details of the slide projector 10, and particularly its modifications for performing the functions of the present invention, slide tray 18 stores a number of photographic transparency slides 38 for injection by the slide advance mechanism of the projector one at a time into display position. The display position is best seen in FIG. 7 wherein a frame 40 of slide 38 is held top and bottom by slide holder 42 with the slide directly in front of lamp 44 and lenses 46 of the projector.

Figure 3:
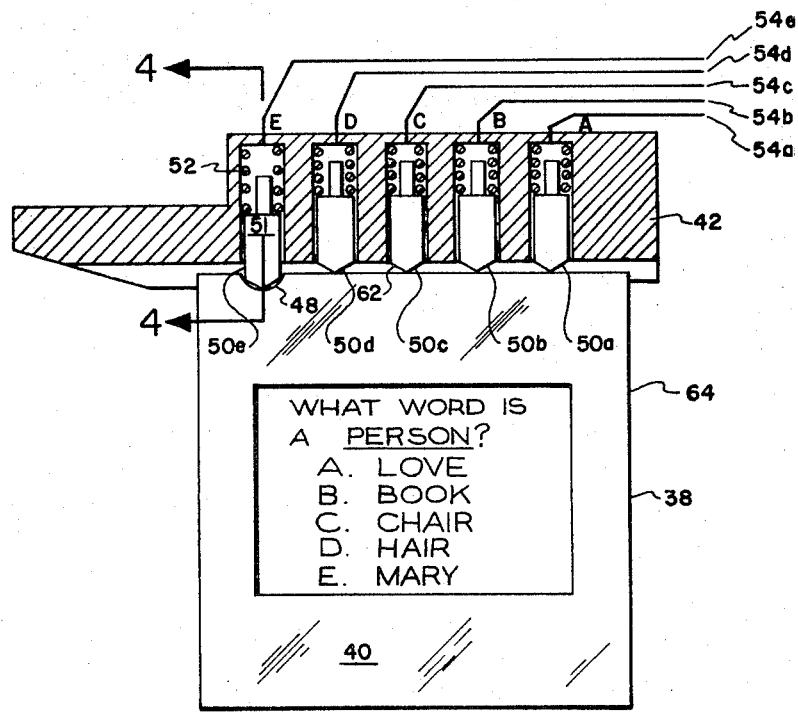
FIG. 3 is a partially sectional side view of a modified portion of the projector slide holder with certain portions removed to show the respective tumbler switches and their interaction with a notched slide frame.

As seen in FIG. 3, frame 40 has a notch 48 cut into its upper edge. The position of notch 48 along the slide edge corresponds to the correct response to the visual question posed by the slide. In the example shown in FIG. 3 the correct response is E and therefore the notch occupies a position to the far left side of the top edge of frame 40. If the correct response were A, B, C or D the notch would occupy one of four locations to the right of notch 48 corresponding respectively with the A, B, C and D responses.

Figure 4:
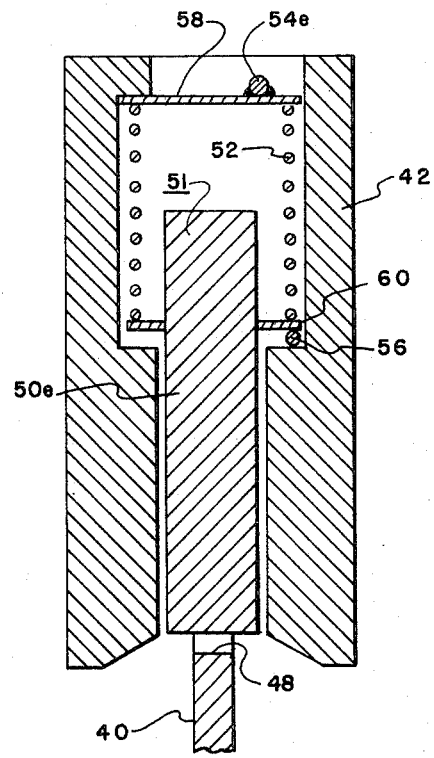
FIG. 4 is a sectional detail view of a tumbler switch taken along line 4—4 of FIG. 3.

The top portion of slide holder 42 is modified to contain five spring-biased tumber switches 50a, b, c, d, and e respectively, aligned with and adjacent to the top edge of frame 40 with each tumbler switch located respectively opposite one of the five possible notch positions. As depicted in FIG. 4, each tumbler switch is biased by spring 52 to a position closing a circuit between a respective conductor 54a, b, c, d, or e and a common buss conductor 56. Conductor 54e of typical tumbler switch 50e is soldered to a brass spring retainer 58 and makes contact with common conductor 56 through conductive spring 52 and lower brass spring retainer 60 when tumbler 51 of switch 50e is allowed to extend fully. However, when a slide 38 is injected into the slide holder the upper edge of frame 40 pushes all tumblers upward out of contact with conductor 56 except for the tumbler which is opposite the notch.

The upward raising of the respective tumbler switches upon insertion of the slide (the direction of insertion being from left to right in FIG. 3) is facilitated by the tumblers having cammed tip surfaces 62 which are engaged by forward edge 64 of frame 40 to raise the tumblers. As shown in FIGS. 3 and 4 tumbler 51, being opposite notch 48, is allowed to extend downwardly under the bias of spring 52 to its full extent despite the presence of slide 38. Therefore, of the five conductors 54a, b, c, d, and e respectively, only conductor 54e is connected with buss conductor 56.

It should be appreciated that a greater or smaller number of tumbler switches could be utilized in conjunction with a like number of notched positions in the slide frame if a greater or lesser number of multiple choice responses were desired.

Figure 5:
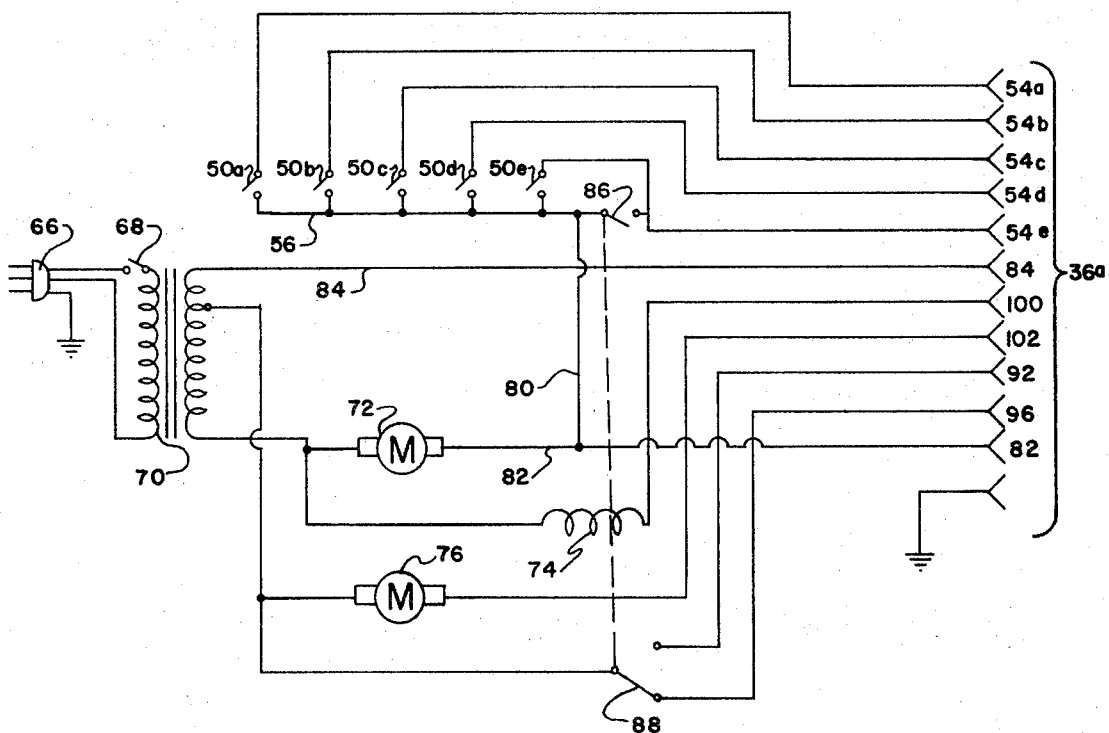
FIG. 5 is a schematic diagram of the electrical circuit of the slide projector modified in accordance with the invention.
Figure 6:
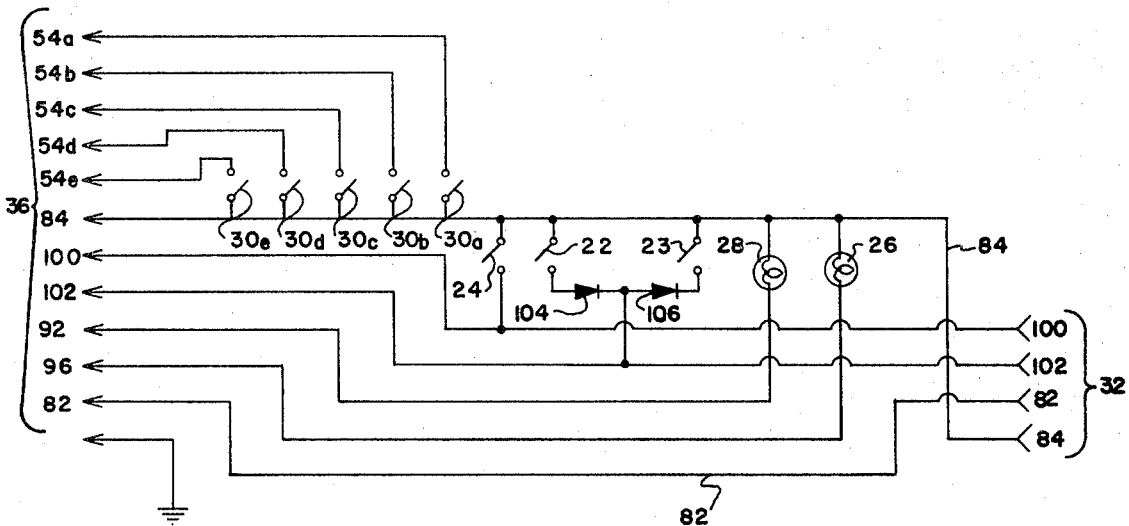
FIG. 6 is a schematic diagram of the electric circuit of the student's remote control terminal.

The cooperating circuitry between the tumbler switches, the automatic slide advance mechanism of the projector, and the student's remote control terminal is shown in FIGS. 5 and 6. The conventional projector as provided by the manufacturer is energized by a power plug 66 for connecting to a source of AC electric potential. An on-off power switch 68 and isolation transformer 70 couples the power source to the remainder of the projector circuitry. The projector in its conventional (unmodified) form is typically equipped with a cycle motor 72 for operating the automatic slide advance mechanism, a shift solenoid 74 which controls the direction of slide cycling (forward or reverse) and a focus motor 76 for adjusting the projector lens in and out for focusing.

In addition to these conventional projector components, certain modifications are included to enable the apparatus to perform the special teaching functions previously described. These include the addition to the circuitry of tumbler switches 50, b, c, d, and e respectively, related conductors 54a, b, c, d, and e, and common buss conductor 56 carried on slide holder 42. Common conductor 56 is connected through lead 80 to line 82 of the cycle motor circuit which, when coupled to main line 84, completes the circuit for actuating the slide advance mechanism. When one of tumbler switches 50a, b, c, d, or e is closed, the switch partially completes a circuit between line 82 and main line 84. The tumbler switches are connected through their respective conductors and through plug and socket assembly 36, 36a with the response button switches 30a, b, c, d, and e respectively of the student's remote control panel 20 as shown in FIG. 6. The normally-open response button switches separate the tumbler switches from connection with a continuation of main line 84 and it therefore requires the closure of a connected pair of tumbler and response switches, for example, switches 50e and 30e, to complete an energizing circuit for the cycle motor between line 82 and main line 84. As explained above this occurs when the student presses the correct response button connected by a lead line to the closed tumbler switch aligned with a respective notch in the frame of the slide then contained in viewing position in the slide holder.

Another modification to the conventional slide projector circuitry is the addition of reverse mode switches 86 and forward-reverse indicator light switch 88, both controlled by actuation of shift solenoid 74. In its forward shift mode solenoid 74 opens switch 86 and moves switch 88 into connection with forward indicator line 96 which completes a circuit with forward indicator light 26 and main line 84 through plug and socket assembly 36, 36a. In its reverse mode shift solenoid 74 closes switch 86 and moves switch 88 into contact with reverse indicator line 92 which completes a circuit with reverse indicator light 28 and main line 84. The closure of switch 86 by shift solenoid 74 in the reverse mode enables completion of the cycle motor circuit by the student's depression of response button 30e regardless of which of the tumbler switches 50a, b, c, d, or e is closed.

Shift solenoid 74 can be actuated by the student from forward to reverse mode, and from reverse back to forward mode, simply by his depressing normally-open button switch 24 on control panel 20 which closes the circuit between shift line 100 and main line 84. When the student is operating the projector in forward mode, as indicated by the illumination of forward indicator light 26, and wishes to review slides previously covered, he presses shift button 24 which concurrently causes reversal of the cycling direction of the slide advance mechanism through actuation of solenoid 74, illumination of the reverse indicator light 28 through switch 88, and closure of switch 86. Thereafter by pressing response button 30e the student may successively review previous slides. To change back to forward mode the student once more depresses shift button 24 which reverses the mode of solenoid 74, illuminates forward indicator light 26 through switch 88, and opens switch 86. The student thereafter proceeds forward through the slides by actuating the correct response button for each slide.

The focus motor 76 of the projector is connected through focus line 102, plug and socket assembly 36, 36a and diodes 104 and 106 with focus control button switches 22 and 23 respectively on the control panel. The focus control switches are normally open leaving an open circuit between the focus motor 76 and main line 84. However, if the student presses button 22 unidirectional current flows between main line 84 and focus line 102 in the direction indicated by diode 104, with the result that focus motor 76 is driven in one direction. If on the other hand, the student presses button 23, unidirectional current flows between focus line 102 and main line 84 in the opposite direction through diode 106 thus driving focus motor 76 in the opposite direction.

As shown in FIGS. 2 and 6 panel 20 is equipped with a socket 32 for accepting the plug of the projector manufacturer's standard remote control device. Socket 32 is connected to cycle motor line 82, focus line 102, shift line 100 and main line 84, respectively, and contains its own push button switches for selectively coupling each of the first three mentioned lines with main line 84 for actuation of cycle motor 72, shift solenoid 74, or focus motor 76 respectively. As can readily be seen from FIG. 6, these circuits can be completed through the manufacturer's remote control device without using any of the button switches located on the student's remote control panel 20, allowing operation of the projector in the normal manner with or without notched slides.

So far the description of the invention has been limited to a purely visual type of teaching aid. This type may be entirely adequate for many teaching purposes, but alternatively it may be desirable to accompany the slide presentation with certain audible information, applicable to at least some of the slides. In such case the circuitry of the student's response terminal 12 is modified so that it may control the two channel tape player 16 depicted in FIG. 1.

Figure 8:
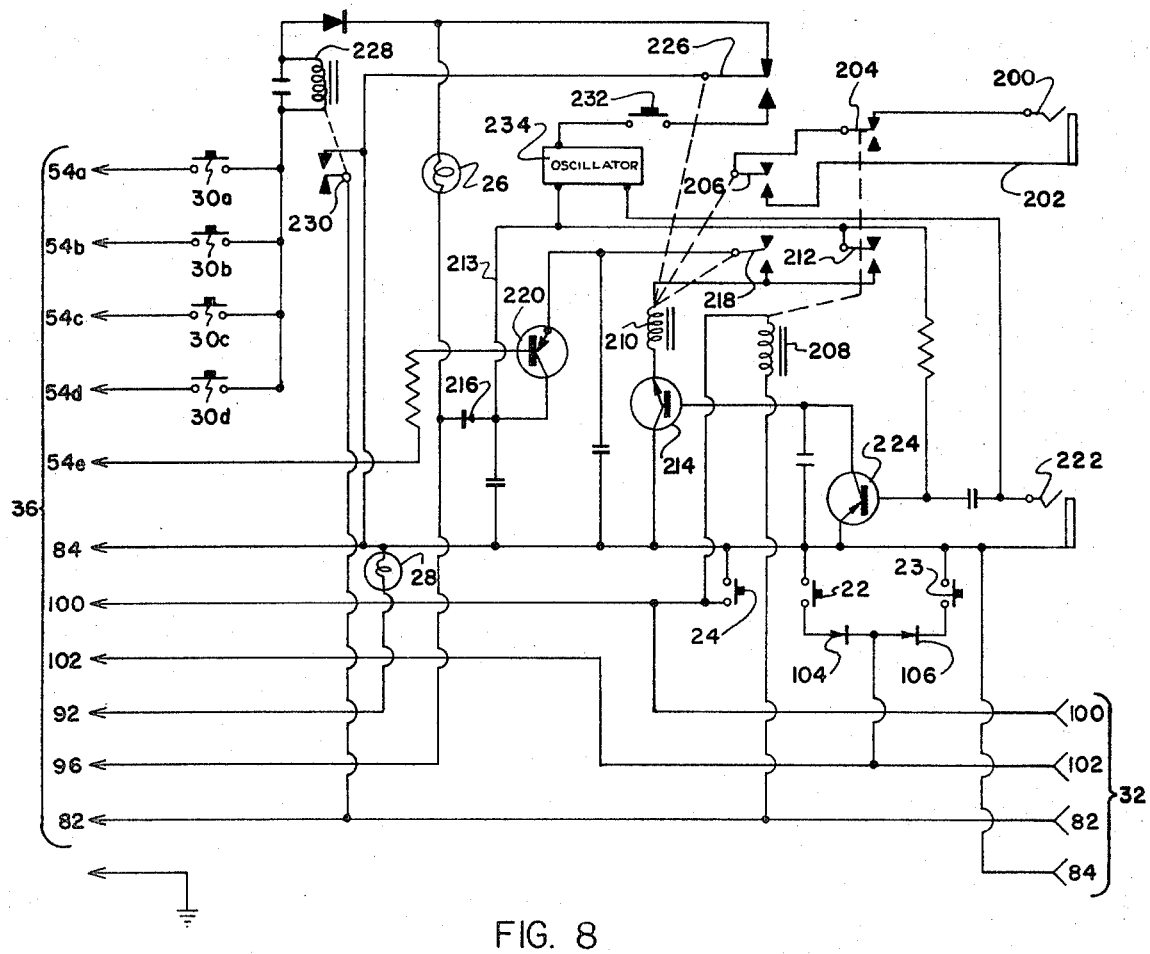
FIG. 8 is a schematic diagram of the electric circuit of th student's remote control terminal modified for coupling with a tape player.

FIG. 8 shows the circuitry of the student response terminal 12 as modified for audio-visual teaching. The terminal is connected to the slide projector through plug 36 with the same leads utilized in the previously described embodiment. As before, the slide projector has tumbler switches 50a, b, c, d and e each coupled with a respective conductor 54a, b, c, d and e. An important difference however is that only tumbler switches 50a, b, c and d correspond to possible correct answers, and the student's control panel contains only four response button switches 30a, b, c and d rather than five. Tumber switch 50e and conductor 54e are used to sense whether or not a particular slide is accompanied by a segment of audio information on tape player 16. If so, frame 40 of slide 38 contains a notch opposite tumbler switch 50e and, in addition, a second notch corresponding with the correct answer to the slide located opposite one of the four remaining tumbler switches. If the frame of the slide contains a notch opposite tumbler switch 50e a circuit is completed through the switch when the slide is inserted into the projector, enabling actuation of the tape player in a manner to be described hereafter. If the frame contains no notch opposite switch 50e, then no circuit is completed through the switch and actuation of the tape player is prevented as long as that particular slide is in viewing position.

The utilization of tumbler switch 50e as the audio indicator switch is convenient where a projector has been modified to include five tumbler switches. Depending upon the type of response terminal utilized, the five switches can provide solely visual teaching with five multiple choice responses, or alternatively can provide audio-visual teaching with four multiple choice responses. If more than four multiple choice responses are desired for audio-visual teaching, more tumbler switches must be utilized in the slide projector. Moreover plug and socket 36, 36a and response terminal 12 must be modified accordingly.

The student's response terminal 12 as modified for audio control (FIG. 8) includes a tape remote control jack 200 coupled with a loop circuit 202 having a pair of series switches 204 and 206. A tape remote control lead (not shown) plugs into jack 200 and serves to actuate the tape player when circuit 202 is closed by both switches 204 and 206 being closed. If either switch 204 or 206 is open, the circuit is broken and the tape player is not actuated. Switch 204 is shown in its biased, normally closed position, while switch 206 is shown in its biased, normally open position.

Actuation of the tape player begins when the student actuates the slide advance mechanism in forward mode by depressing a proper response button. Actuation of cycle motor 72 energizes relay 208 which in turn opens switch 204. The opening of switch 204 prevents actuation of the tape player as long as relay 208 remains energized by actuation of the cycle motor (i.e., until the next slide is positioned in the slide projector). Simultaneously with the opening of switch 204, relay 208 closes switch 212 which completes a circuit energizing relay 210, such circuit running from line 84 through relay control transistor 214, relay 210, switch 212, line 213, diode 216, and line 96. Upon completion of this circuit relay 210 closes switch 206 and switch 218 simultaneously. As long as cycle motor 72 is running, however, the closure of switch 206 does not thereby start the tape player because switch 204 is held open by relay 208.

At the end of the slide advance cycle a new slide is inserted into slide holder 42 and, if the slide contains a notch in the E position, tumbler switch 50e closes establishing a complete circuit extending between conductor 54e and line 82, through cycle motor 72, transformer 70, line 96, diode 216, and through the base of transistor switch 220. The completion of this circuit properly biases transistor 220 to its conducting mode and completes a circuit between relay 210 and line 96 through switch 218 and transistor 220, bypassing switch 212 and line 213. Thus when the slide advance cycle is completed and relay 208 is de-energized, allowing switch 204 to close and switch 212 to open, relay 210 remains energized and thus retains switches 206 and 218 in their closed positions, Now switches 204 and 206 are both closed, and the tape player is actuated through remote control jack 200. Had the slide not contained a notch in the E position, transistor 220 would not have been properly biased to complete a circuit through relay 210, and upon the termination of the slide advance cycle and the de-energization of relay 208, relay 210 would also have been de-energized, permitting switch 206 to open and preventing the acutation of the tape player for that particular slide.

Once the tape player is actuated, it continues to play until a signal on a second channel of the tape indicates the end of the audio segment corresponding to the particular slide. The signal is picked up through a tape signal jack 222 and is amplified by transistor 224 and fed through the base of relay control transistor 214. The amplified signal acts to reverse-bias transistor 214 and prevent its conducting current to relay 210. The interruption of current de-energizes relay 210, allowing switches 206 and 218 to open, thereby stopping the tape player.

In order to ensure that the tape player will not lose synchronization with the slide display by the student's premature depression of a correct response button while the tape is playing, a switch 226 prevents actuation of the slide advance mechanism while switch 206 is closed. When switch 226 is in its normally closed position as shown in FIG. 8, it allows actuation of the slide advance mechanism when the correct answer button is pushed. However when relay 210 is energized and switch 206 is closed, switch 226 is simultaneously opened, thereby preventing the completion of a circuit between switches 30a, b, c or d and main line 84. Forward indicator light 26 is also switched off by the opening of switch 226, indicating to the student that he should not press any of the response buttons until the light is once more energized. The opening of switch 226 does not stop the completion of a slide advance cycle already in progress since cycle motor 72 has integral means for maintaining a closed circuit until the completion of a cycle.

Relay 228 and associated switch 230 are provided to further aid proper synchronization by ensuring that even a light, instantaneous touching of a correct response button will generate a sufficient pulse to actuate cycle motor 72 if switch 226 is closed. This is necessary because even a short, instantaneous depression of the proper response button would probably be sufficient to energize relays 208 and 210 and start the tape player.

It should be recognized that the circuit controlling the energizing of relay 210 draws its power from transformer 70 through main line 84 and forward indicator line 96, and that therefore the actuation of the tape player and the related functions caused by relay 210 can occur only when the automatic slide advance mechanism of the projector is in forward mode. In reverse mode the tape player does not operate.

The instructor may program the tape quite simply with the aid of the student's remote control terminal. Rather than attaching an output lead from the second channel of the tape player to jack 222, the instructor attaches an input lead to the tape player instead. Then, after properly notching the slides, he runs them through the projector in the desired order and dictates an audio segment for each slide having an E notch. At the end of each segment he presses button 232 which supplies power to oscillator 234 and records a signal on the second tape channel indicating the end of the audio segment.

The terms and expressions which have been employed in the foregoing abstract and specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is Claimed is:

1. A slide projector having an automatic slide advance mechanism for displaying a succession of slides, each slide having visual material thereon for evoking a response from a person viewing said slides and further having respective coded indicia thereon corresponding to possible response by said person, sensor means adjacent each said coded slide when said slide is displayed in said projector for sensing said coded indicia and coupled with said automatic slide advance mechanism for controlling the actuation of said mechanism in response to said indicia, and response means coupled with said sensor means and said automatic slide advance mechanism for registering said person's response to said visual material and for controlling the actuation of said slide advance mechanism depending upon the relation between said person's response registered by said response means and said coded indicia sensed by said sensor means, wherein the improvement comprises: reversing means coupled with said slide advance mechanism for reversing the direction of advance of said mechanism to display said slides in reverse succession, and means coupling said response means with said slide advance mechanism when in said reverse direction for controlling the actuation of said slide advance mechanism by said response means regardless of the relation between said person's response and said coded indicia.

2. The slide projector of claim 1 including indicator lights coupled with said reversing means for indicating to said person whether the automatic slide advance mechanism is operating in forward or reverse direction.

3. An audio-visual teaching device comprising:
a. a slide projector for displaying successive slides containing visual teaching material;
b. record player means coupled with said slide projector for presenting audible information in synchronization with the display of said slides;
c. coded indicia on said slides indicating whether or not said record player means contains audible information corresponding to a particular slide; and
d. audio control means including sensor means mounted on said slide projector for sensing said coded indicia, said audio control means being coupled with said record player means for controlling the actuation of said record player means in response to said indicia.

4. The teaching device of claim 3 wherein said audio control means actuates said record player means during the display of any slide having coded indicia signifying the presence of corresponding audible information on said record player means.

5. The teaching device of claim 4 wherein said record player means includes signal means coupled with said audio control means for interrupting the actuation of said record player means after a predetermined segment of audible information has been presented.

6. The teaching device of claim 5 wherein said record player means comprises a multiple channel tape player having one channel containing said audible information and a second channel containing a series of signals indicating the end of each said segment of audible information, said second channel comprising said signal means.

7. The teaching device of claim 5 wherein said audio control means includes means for preventing the further actuation of said record player means after said signal means has interrupted said actuation until said slide has been withdrawn from display position in said slide projector.

8. The teaching device of claim 3 wherein said slide projector has an automatic slide advancing mechanism and wherein said audio control means includes means coupled with said slide advancing mechanism for preventing actuation of said slide advancing mechanism during the actuation of said record player means.

9. The teaching device of claim 8 including an indicator light coupled with said audio control means for indicating when said audio control means is preventing actuation of said slide advancing mechanism.

10. The teaching device of claim 8 including reversing means coupled with said automatic slide advancing mechanism for reversing the succession of the slide display, and including means coupled with said audio control means for preventing actuation of said record player means when said slide advance mechanism is so reversed.

11. The teaching device of claim 3 wherein said coded indicia on said slides comprises a notch formed in an edge of at least some of said slides, signifying the presence of corresponding audible information on said record player means.

12. A self-teaching accessory for a standard multipurpose photographic slide projector of the type having an automatic slide advance mechanism and an electrical control circuit for actuating said slide advance mechanism, said accessory comprising response means for enabling a student to register one of several possible responses to respective questions posed to said student and adapter means for permitting said response means to be coupled with said projector's slide advance control circuit, said adapter means including means for modifying said slide advance control circuit to enable said slide advance mechanism to act as an indicator of the correctness or incorrectness of said student's responses in addition to its normal function.

13. The device of claim 12 wherein said slide projector includes a slide holder for holding standard framed photographic slides in position for projection, and wherein said adapter means includes a modified slide holder for holding said standard slides adaptable for mounting in said projector in place of said standard slide holder.

14. A self-teaching accessory for a standard multipurpose photographic slide projector of the type having a slide holder for holding standard framed photographic slides in position for projection, an automatic slide advance mechanism and an electrical control circuit for actuating said slide advance mechanism, said accessory comprising response means for enabling a student to register one of several possible responses to respective questions posed to said student and adapter means for permitting said response means to be coupled with said projector's slide advance control circuit, said adapter means comprising means for modifying said slide advance control circuit to enable said slide advance mechanism to act as an indicator of the correctness or incorrectness of said student's responses including a modified slide holder for holding said standard slides adaptable for mounting in said projector in place of said standard slide holder, said modified slide holder including a group of electrical switches adaptable to be interposed in said projector's slide advance control circuit for controlling the actuation of said slide advance mechanism.

15. The accessory of claim 14 wherein said response means includes a second group of electrical switches and wherein said adapter means includes means for permitting said second group of switches also to be interposed in said projector's slide advance control circuit for controlling the actuation of said slide advance mechanism in conjunction with said first group of switches.

16. The accessory of claim 15 wherein said adapter means includes coupling means for permitting the selective short circuiting of said two groups of switches so as to eliminate said switches from their interposing relationship with respect to said projector's slide advance control circuit when desired.

17. The accessory of claim 14 wherein said projector's slide advance control circuit comprises a remote control device coupled with said projector through a plug and socket assembly mounted on said projector, and wherein said adapter means comprises a modified plug and socket assembly adaptable for mounting on said projector in place of said original plug and socket assembly, said response means comprising a modified remote control device adapted to be coupled with said control circuit through said modified plug and socket assembly.

18. The accessory of claim 14 wherein said adapter means includes means for permitting said indicator function of said modified slide advance mechanism to be selectively eliminated without requiring the removal of said adapter means from said slide projector.

19. A method of converting a standard, multipurpose photographic slide projector having an electrically controllable automatic slide advance mechanism to a visual self-teaching device, which comprises:
 a. replacing the original slide holder of said projector with a modified slide holder capable of holding standard framed photographic slides in position for projection, said modified slide holder including a group of electrical switches;
 b. interposing said group of electrical switches in said slide projector's electrical control circuit for actuating said automatic slide advance mechanism;
 c. interposing a second group of electrical switches in said projector's slide advance control circuit for registering student responses to questions posed by said photographic slides; and
 d. forming coded response indicia on the standard frames of said photographic slides so that such indicia may be sensed by said first group of switches.

20. The method of claim 19 wherein the step of forming said coded response indicia on said standard photographic slide frames comprises removing a portion of the material of each said slide frame.

21. A method of converting a standard, multipurpose photographic slide projector having an electrically controllable automatic slide advance mechanism to a visual self-teaching device, which comprises:
 a. replacing the original slide holder of said projector with a modified slide holder capable of holding standard framed photographic slides in position for projection, said modified slide holder including a group of electrical switches adaptable for sensing coded indicia on the frames of said photographic slides;
 b. interposing said group of electrical switches in said projector's electrical circuit for controlling the actuation of said automatic slide advance mechanism; and
 c. adapting said projector's slide advance control circuit to permit the interposing therein of a second group of electrical switches for registering student responses to questions posed by said photographic slides.

* * * * *

UNITED STATES PATENT OFFICE
CERTIFICATE OF CORRECTION

Patent No. 3,755,919          Dated September 4, 1973

Inventor(s) Donald E. Chittick

It is certified that error appears in the above-identified patent and that said Letters Patent are hereby corrected as shown below:

Abstract, Line 4 from bottom, right column change "farme" to --frame--.

| | | |
|---|---|---|
| Col. 3, | Line 16 | Change "selfteaching" to --self-teaching--. |
| | Line 28 | After "self-teaching" delete the comma. |
| | Line 36 | Change "of" to --by--. |
| | Line 66 | Change "th" to --the--. |
| Col. 5, | Line 47 | After "50" insert --a--. |
| Col. 7, | Line 26 | Change "Tumber" to --Tumbler--. |
| Col. 8, | Line 30 | After "positions" change the comma to a period. |
| Col. 9, | Line 46 | After "to" insert --a--. |

Signed and sealed this 18th day of December 1973.

(SEAL)
Attest:

EDWARD M. FLETCHER, JR.      RENE D. TEGTMEYER
Attesting Officer                Acting Commissioner of Patents